United States Patent [19]
Ross et al.

[11] Patent Number: 5,218,467
[45] Date of Patent: Jun. 8, 1993

[54] MULTI-ACCESS LASER COMMUNICATIONS TRANSCEIVER SYSTEM

[75] Inventors: Monte Ross, St. Louis, Mo.; Donald C. Lokerson, New Carrollton; Michael W. Fitzmaurice, Gambrills, both of Md.; Daniel D. Meyer, St. Louis, Mo.

[73] Assignee: NASA and Laser Data Technology, Inc., St. Louis, Mo.

[21] Appl. No.: 635,856

[22] Filed: Dec. 28, 1990

[51] Int. Cl.⁵ .......................................... H04B 10/00
[52] U.S. Cl. ..................................... 359/172; 342/357
[58] Field of Search ............... 359/172, 159, 169, 170; 342/352, 356, 357; 455/12

[56] References Cited

U.S. PATENT DOCUMENTS 4,652,884 3/1987 Starker .............................. 342/356
4,933,928 6/1990 Grant et al. ......................... 359/172

Primary Examiner—Edward L. Coles, Sr.
Assistant Examiner—R. Bacares
Attorney, Agent, or Firm—Senniger, Powers, Leavitt & Roedel

[57] ABSTRACT

A satellite system for optical communications such as a multi-access laser transceiver system. Up to six low Earth orbiting satellites send satellite data to a geosynchronous satellite. The data is relayed to a ground station at the Earth's surface. The earth pointing geosynchronous satellite terminal has no gimbal but has a separate tracking mechanism for tracking each low Earth orbiting satellite. The tracking mechanism has a ring assembly rotatable about an axis coaxial with the axis of the field of view of the geosynchronous satellite and a pivotable arm mounted for pivotal movement on the ring assembly. An optical pickup mechanism at the end of each arm is positioned for optical communication with one of the orbiting satellites by rotation of the ring.

9 Claims, 7 Drawing Sheets

MULTI-ACCESS LASER COMMUNICATIONS TRANSCEIVER SYSTEM

This invention was made with Government support under SBIR No. NAS5-30599 awarded by NASA. The Government has certain rights in the invention.

FIELD OF THE INVENTION

The invention relates generally to communications systems that utilize laser transmission, and, more particularly, an orbiting satellite system using a tracking system to direct the laser transmissions.

BACKGROUND OF THE INVENTION

Multi-access simultaneous asynchronous communication is commonly used for long range communication. Although point-to-point communication between two dedicated transceivers may be used for some applications, such a system is not sufficient for applications requiring a multiplicity of terminals on one platform such as a plurality of low earth orbit (LEO) satellites communicating with a single geosynchronous (GEO) relay satellite.

Optical communications, because of narrow laser beams, is generally considered a point-to-point technology, and has not been applied to multi-access use. There is a need for a "many points to one point" multi-access laser system which is light in weight, uses low power and is small in size. Normally, optical communication terminals require a gimbal to provide coverage over the angles the LEO satellite makes with the GEO satellite as it transverses its orbit. The gimbal enables precise directional capability of one terminal pointing to another, but precludes one GEO terminal simultaneously communicating with a plurality of LEO satellites widely dispersed in angle.

SUMMARY OF THE INVENTION

It is therefore an object of this invention to provide a multi-access laser communication system using movable image pickups to enable transmissions between an earth viewing geosynchronous satellite and Low Earth Orbiting (LEO) satellites simultaneously and asynchronously.

It is a further object of this invention to provide a gimballess fixed telescope system for a geosynchronous satellite enabling a plurality of LEO satellites to optically communicate with the geosynchronous satellite over a wide field of view.

It is a further object of this invention to provide a small, light weight, low power satellite terminal which communicates over a wide field of view using a plurality of movable image pickups in the system.

It is a further object of this invention to provide a communication system which utilizes rotatable rings and pivotal arms where the rings are vertically stacked and each ring assembly supports an independent fiber optic cable channel to each conventional laser transceiver.

BRIEF DESCRIPTION OF THE DRAWINGS

The invention, as well as further objects and advantages thereof, will best be understood by reference to the following detailed description of a preferred embodiment taken in conjunction with the accompanying drawings, where like reference characters identify like elements through the various figures, in which.

DETAILED DESCRIPTION OF A PREFERRED EMBODIMENT

Figure 1:
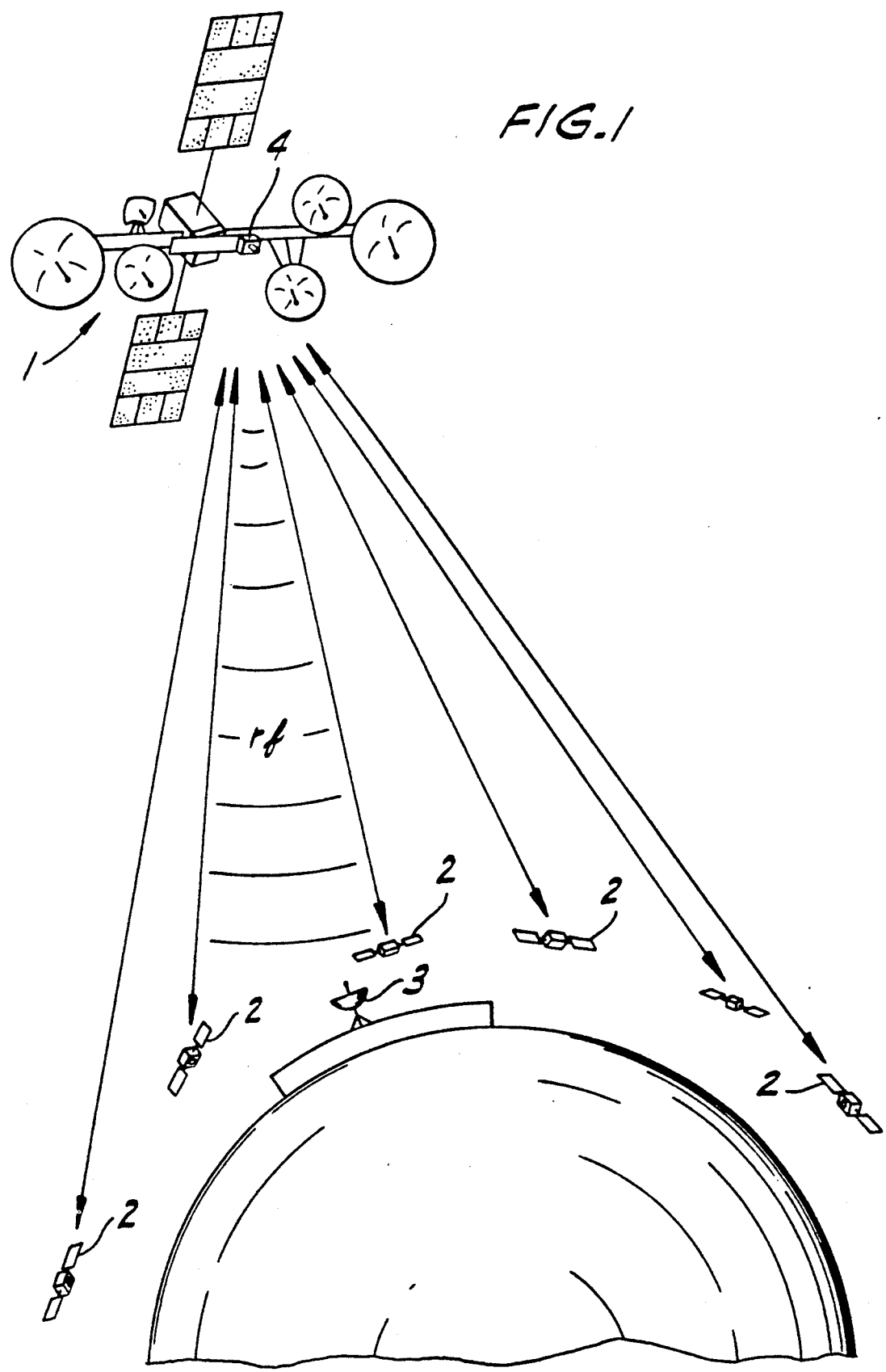
FIG. 1 is a diagrammatic illustration of a communications transceiver system according to the invention including a plurality such as low Earth orbiting (LEO) satellites, with up to six communicating with one geosynchronous (GEO) multiple access terminal satellite at one time.

Referring now to the drawings, FIG. 1 shows a two-stage space system whereby a geosynchronous satellite (GEO) 1 relays satellite data from six low Earth orbiting (LEO) satellites 2 to a ground station 3 located on the Earth's surface. The six LEOs 2 communicate simultaneously to the GEO 1, while the GEO 1 provides command and control data to the LEOs 2. The GEO 1 relays the data to the ground station 3 via an rf or other communications link. In the first stage of the space system, each LEO 2 collects satellite data and transmits the data to the GEO 1 via a modulated laser beam such as at a 3 megabits per second (Mbps) data transfer rate. The second stage involves the relaying of the data by the GEO 1 to a ground station 3 at the surface of the Earth via a modulated radio frequency signal. Although the GEO 1 communicates simultaneously with more than one LEO 2, the LEOs operate as if they were communicating with a dedicated relay terminal. The GEO's multi-access capability does not require special information from or special action by the LEOs.

A multi-access laser terminal 4 which communicates with the LEOs is located on the GEO 1. The terminal 4 weighs typically less than 150 pounds, uses a 10 inch effective diameter fixed telescope, uses less than 100 watts of regulated power, and requires less than 8 cubic feet. Other features of the terminal 4 include its ability to handle up to 6 simultaneous independent asynchronous links to LEOs satellites and to cover planetary orbits using a fixed aperture without the use of gimbals because the spacecraft adequately continually faces the planet. The laser communication of the terminal 4 is capable of receiving data typically such as at the rate of 3 megabits per second for each link.

Figure 2:
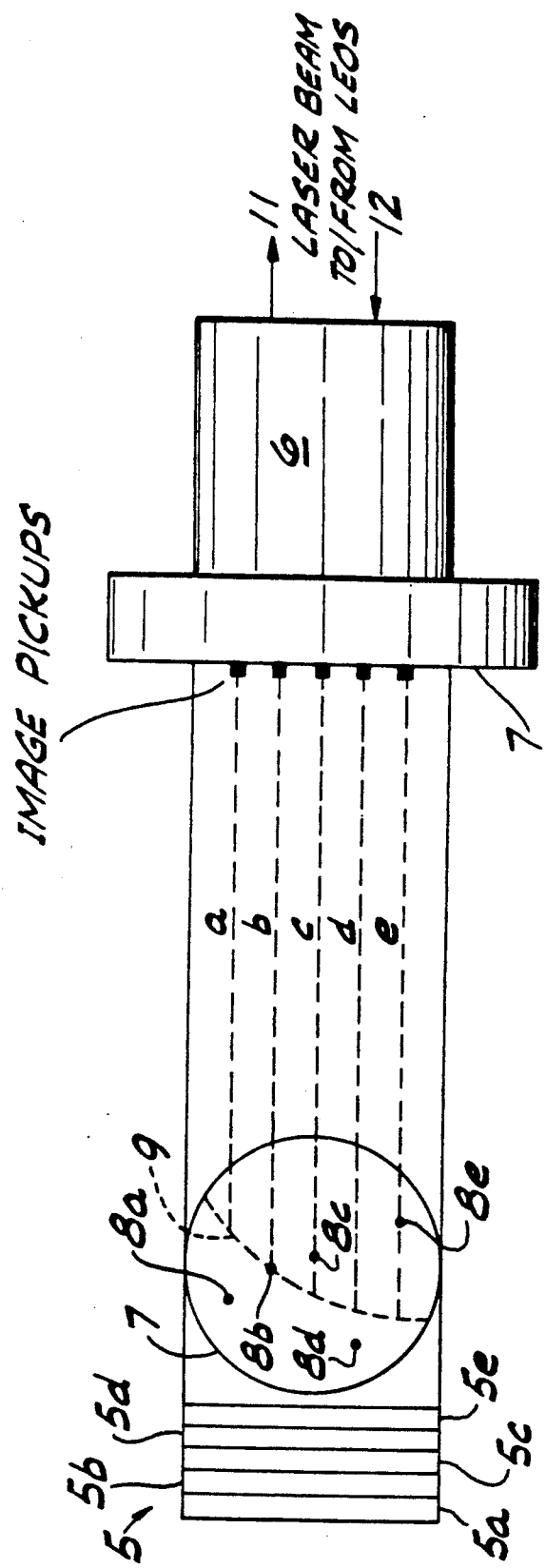
FIG. 2 is a conceptual illustration of the movable image pickup system of the invention showing images of low Earth orbiting (LEO) satellites as viewed by a geosynchronous satellite terminal.

Referring to FIG. 2, the basic approach which makes these advantages feasible is the movable image pickup system 5 of the GEO 1. As the LEO satellites are viewed by a fixed telescope 6, their image is projected onto a circular image plane 7. In FIG. 2, the fixed telescope 6 is shown from a side view projecting onto a front and illustratively rotated, planar view of its image plane 7. Each point 8a-8e within the circular image plane represents a unique angular position of pickup channels directed toward a visible LEO satellite location. As a LEO satellite circles the Earth its trail forms a curved line image 9 on the circular image plane 7. The image pickup system 5 enables a small optical system to move to each LEO satellite's approximate position on the plane and then acquire, track, and communicate with the LEO. A separate pickup channel is needed from each LEO satellite being simultaneously tracked. As illustrated, ring 5a picks up channel a, ring 5b picks up channel b and so on.

The multi-access terminal 4 of the GEO 1 uses the movable image pickup system 5 to track each of the LEOs. The multi-access terminal 4 allows the GEO 1 to access each LEO at appropriate times. Statistically, there is a very low probability of all six channels being utilized at the same time, since all six satellites would have to be in view of the geosynchronous satellite. In order to track a LEO after it disappears behind the Earth, the multi-access terminal calculates upcoming LEO orbits based on ephemeris data and ground track updates.

Figure 3:
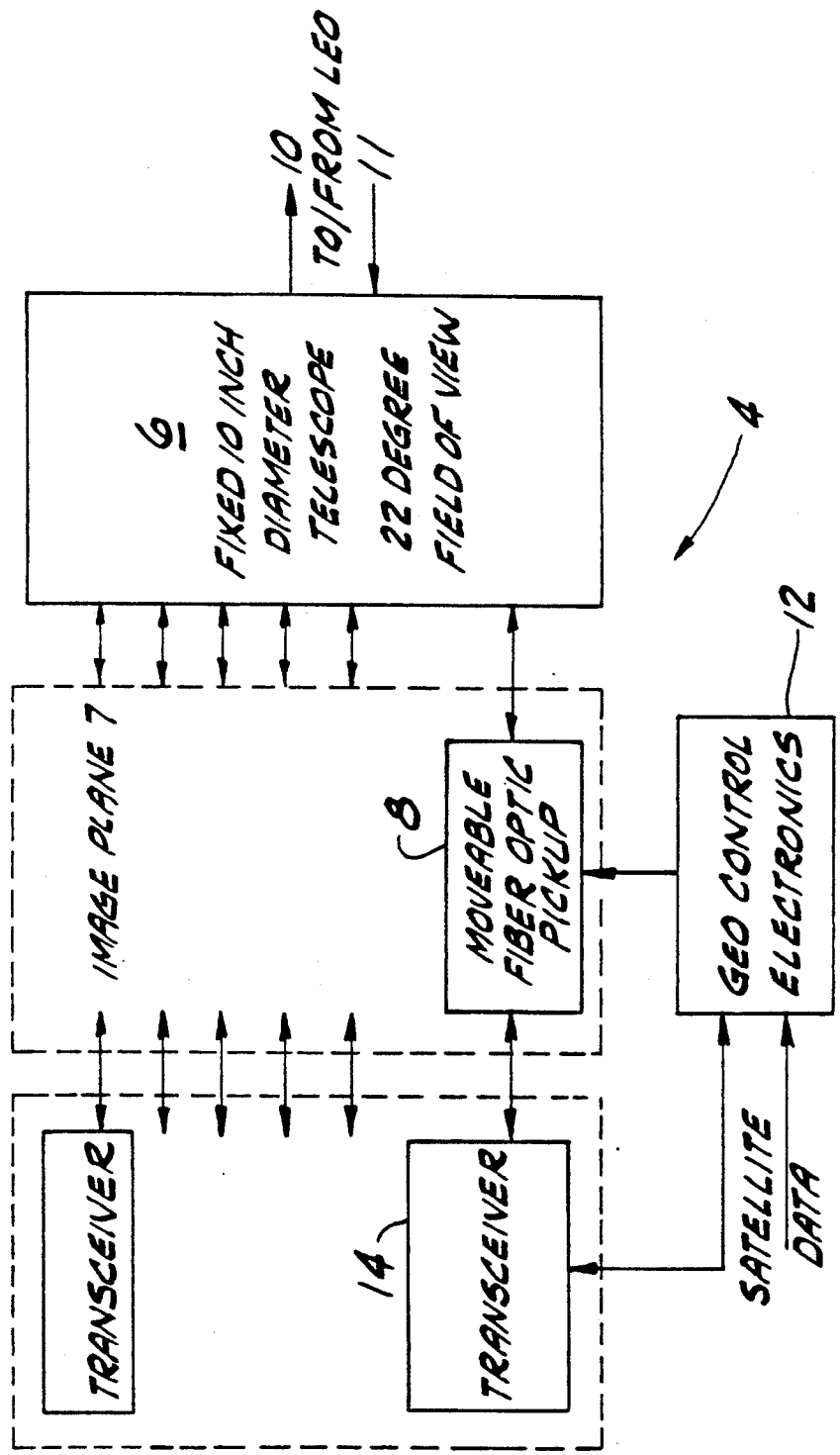
FIG. 3 is a block diagram of a movable fiber optic pickup of the multiple access terminal of the invention.

A block diagram of the multi-access terminal 4 of the GEO 1, shown in FIG. 3, exemplifies a gimballess tracking system utilizing a plurality of movable fiber optic pickups 8, each with a corresponding transceiver 14. The transmission laser beam 11 and reception laser beam 10 travel along the same path for two-way communication and tracking with the LEO satellites. The small movable pickups 8 eliminate gimbals and large optics for each channel since the one large diameter fixed telescope 6 provides the collection aperture necessary to readily close the link with a small LEO transmitter. Terminal 4, having a telescope 6 with a field of view of 22°, is capable of encompassing all LEO orbits. The GEO control electronics 12 performs satellite computer analysis of LEO orbits for guiding the multiplicities of image pickups and performs feedback control on the received signals to position the pick-ups precisely to enable tracking of each LEO satellite. Algorithms are stored by the GEO control electronics 12 to minimize shadowing of the movable image pickup systems from the ones above. The GEO control electronics 12 uses ephemeris data of each LEO 2 to calculate their orbital positions and uses GEO satellite attitude data to control the position of pick-ups 8.

In one form of the terminal 4, each of six pickups 8 is a ring and arm assembly which rotates and pivots to follow satellite passes. The combination of the ring/arm assembly and the large field of view of the fixed telescope eliminates the need for a gimbal system. The six ring/arm assemblies are capable of sharing the single fixed telescope 6, thereby saving space, weight, and cost.

Figure 4:
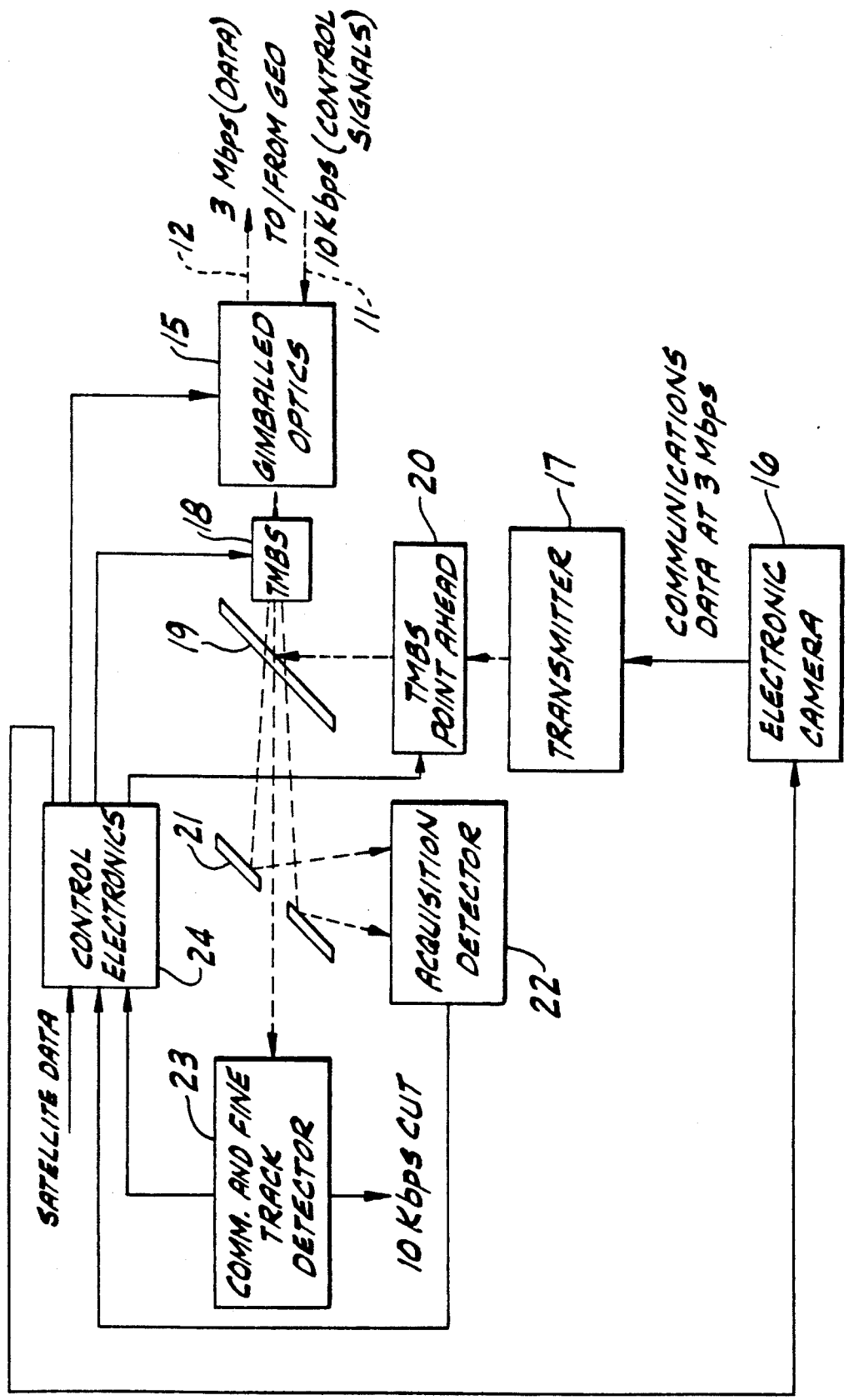
FIG. 4 is a block diagram of the low Earth orbiting (LEO) satellite terminal compatible with (no claims for it specifically the invention.

FIG. 4 shows a conventional, typical compatible LEO terminal block diagram using gimballed optics 15 to transfer data to and from the GEO 1. A data generating device, such as an electronic camera 16, delivers data to a laser transmitter 17 so that the data may be transmitted through gimballed optics 15 to the GEO 1. Working with the gimballed optics 15, a Torque Motor Beam Steering (TMBS) 18, a dichroic mirror 19, and a torque motor beam steering (TMBS) Point Ahead device 20 direct the laser beam toward the GEO 1, sending the data at 3 megabits per second via beam 12.

The conventional, typical optical LEO terminal also receives control signals from the GEO 1 at the rate of 10 kilobits per second via beam 11. The incoming signals pass through the gimballed optics 15, TMBS 18, and dichroic mirror 19 where part of the signal passes through the aperture in mirror 21 and is deflected by a bifurcating mirror 21 to an acquisition detector 22 and the other part of the signal is received by the communication and fine track detector 23. The acquisition detector 22 compares the multiple incoming signals deflected by the bifurcating mirror 21 to determine the direction from which the signal is coming, and the communication and fine track detector 23 analyzes the incoming control signals for information concerning its orbit or data transmissions. Both the acquisition detector 22 and the communications and fine track detector 23 feed information back to the control electronics 24 which will use the information to appropriately adjust the gimballed optics 15, TMBS 18, and TMBS point ahead 20 and terminal in general. The typically 10 Kbps output of detector 23 is provided to be used as needed, such as the electronic camera 16 for controlling system operation. Electronics 24 also include satellite data which controls position of TMBS 18 and gimballed optics 15.

The resultant characteristics of the LEO laser transceiver in this exemplary embodiment include a 3 inch gimballed aperture and a 50 watt, 50 pound package, which is quite small due to the single large aperture in the multiaccess terminal. In general, the larger the GEO aperture, the smaller the LEO transmitter requirements. The following Table I is a list of an example of the features of the LEO satellite laser transceiver.

TABLE I

| LEO SATELLITE LASER TRANSCEIVER (USING 10 INCH TELESCOPE IN GEO) GALLIUM ALUMINUM ARSENIDE DIODE TRANSMITTER (.8 um) | |
|---|---|
| DATA RATE | 3 Mbps |
| AVERAGE LASER POWER | 280 MILLIWATTS |
| BEAM FOR COMMUNICATIONS | 40 MICRORADIANS |
| TRANSMIT APERTURE | 3 INCHES |
| WEIGHT | APPROX. 50 LBS |
| POWER | APPROX. 50 WATTS |

Figure 5:
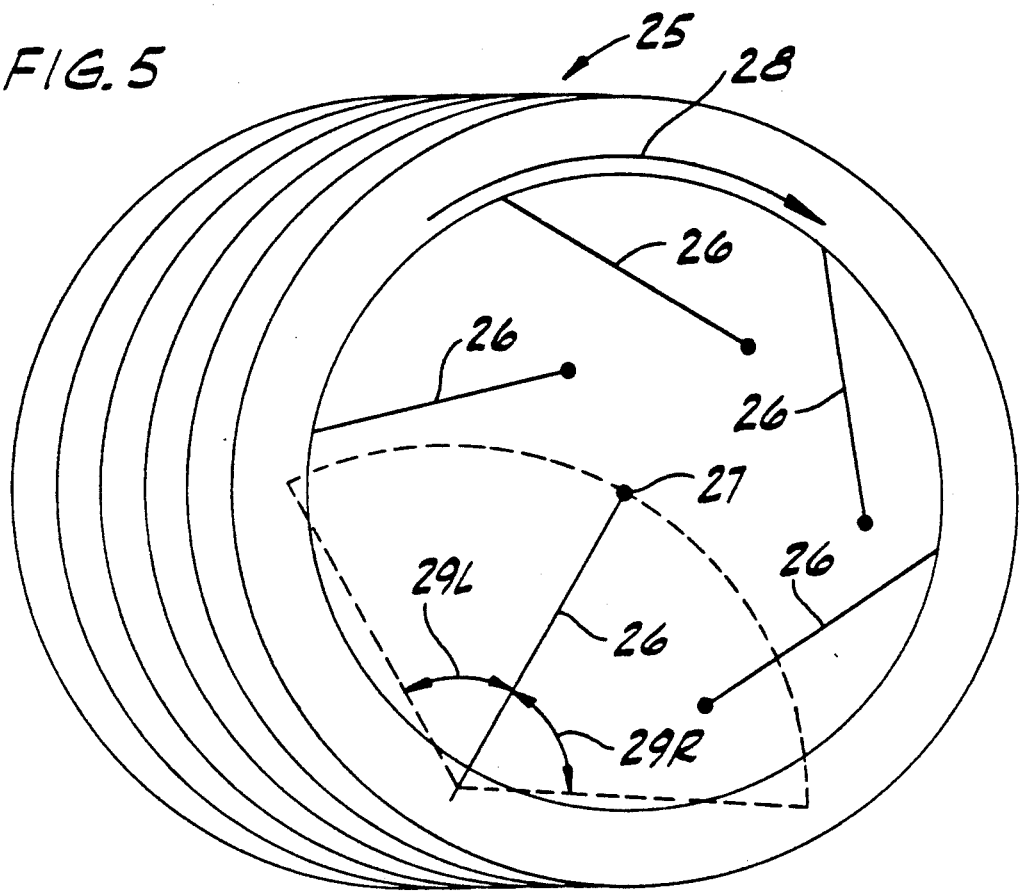
FIG. 5 is a diagrammatic perspective view of one embodiment of the movable image pickup system of the invention showing a stack of six rings and their arms.

There are various implementations of the movable pickup optics of the GEO preferred embodiment. One is a ring and arm system shown in FIG. 5 which utilizes open rings 25 coaxially stacked where each ring 25 receives a channel. Each ring 25 has a rotatable arm 26 of length equal to the ring radius. The end of the arm has a mirror pickup 27 which folds the light into fiber optics located on the arm 26. The arm 26 is maintained in alignment with the image being tracked by rotation of the ring 25 as indicated by arrow 28 and by pivoting of the arm 26 as indicated by arrows 29L and 29R. With six such assemblies, six channels can be operating simultaneously and asynchronously, communicating and tracking six different LEO satellites.

Figure 6:
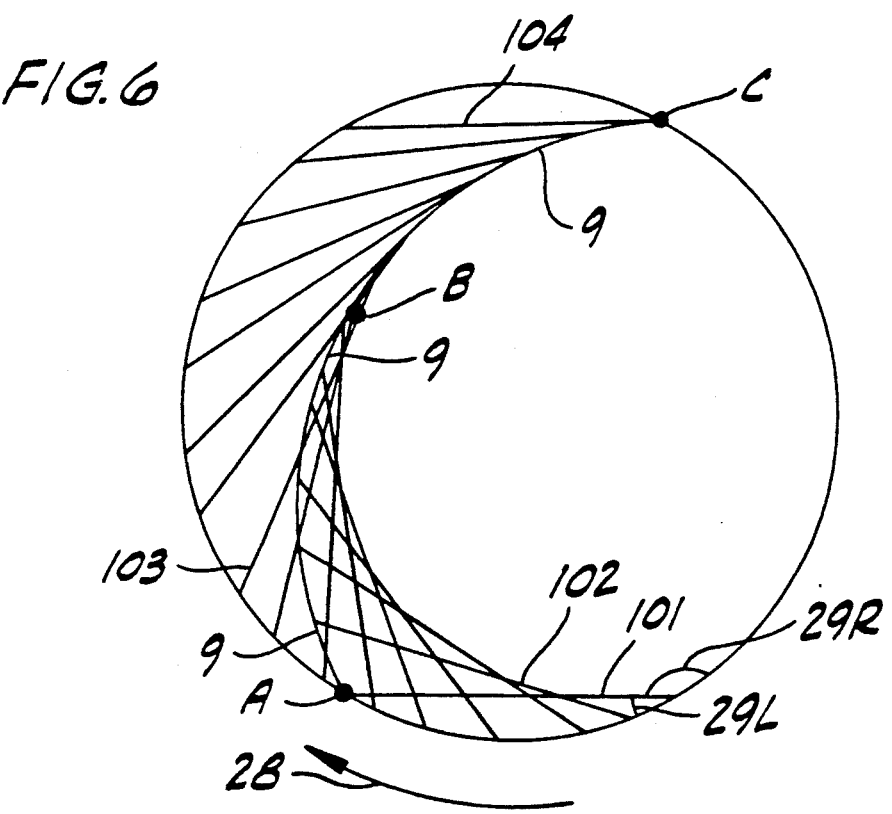
FIG. 6 is a diagrammatic view of one embodiment of the movable image pickup system of the invention showing a ring and arm rotation as they follow the path of an orbiting satellite.

A typical ring rotation and arm pivot on a LEO satellite pass is shown in FIG. 6. Because each LEO satellite 2 typically travels in a curved path relative to the multi-access terminal 4, the ring 25 and arm 26 move in conjunction with each other to track the path of the LEO satellite.

Initially, the arm 26 is in position 101 so that the pickup is in position A. As the satellite image through the telescope travels along path 9, the arm 26 moves to position 102 by rotating ring 25 in direction 28 and by pivoting arm 26 in direction 29R. Eventually, by continued rotation of ring 25 in direction 28 and by continued pivoting of arm 26 in direction 29R, the arm 26 reaches position 103 so that the pickup is in position B As the satellite image through the telescope continues to travel along path 9, the arm 26 moves to position 104 by rotating ring 25 in direction 28 and by pivoting arm 26 in direction 29L. Thereafter, ring 25 is rotated in the opposite direction from 28 so that the ring and arm are once again in appropriate position ready to pick up the satellite during its next orbital sweep across the field of view of the telescope. The LEO satellite position will change each orbit but this will be known prior to the orbit so that one of the ring and arm assemblies can be at the desired angles.

Figure 7:
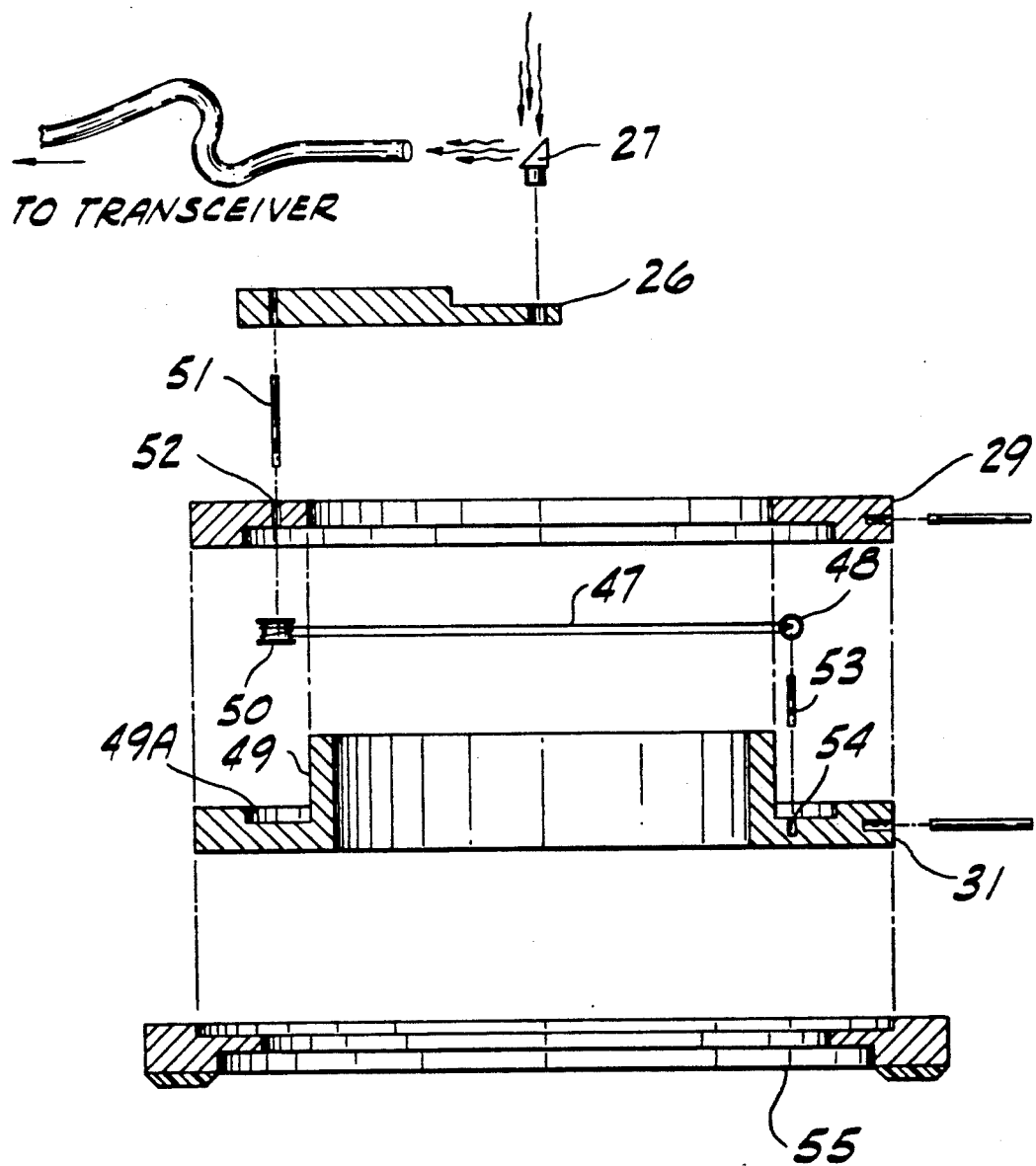
FIG. 7 is a cross-sectional view of one embodiment of a ring and arm with a drive mechanism of the movable image pickup system of the invention.

One preferred embodiment of a single channel ring and arm assembly, shown in FIG. 7, is mechanical in design and provides independent control of the ring and arm. The ring assembly comprises two coaxial rings 29, 31, one over the other, with the arm 26, having a length equal to the inside opening of the ring radius, riding on the top ring. A pickup mirror 27 that directs the light into a fiber optic cable that, using a service loop, delivers the signal to the transceiver assembly is attached to the free end of the arm 26. By applying motion to both rings together, the ring assembly rotates to any position within 360° without movement of the arm. By applying motion to the top ring 29 only, the arm angle changes, but the ring assembly does not move in position.

Even though the arm is pivoting with respect to the upper ring, the position of the lower ring determines the arm's pivotal position because a tensioning means connects the arm to the lower ring. The tensioning means is an elastic string 47 connected at its ends by a metal spring 48 to keep the string 47 taut against an inner lip 49 of the lower ring 31. The string 47 is wrapped around a flat spool 50 connected to the base of the arm. Ring 31 includes an annular recess 49A to accommodate spool 50 and permit it to rotate around ring 31. A small pin 51 journaled to the flat spool passes a hole 52 on one side of the upper ring pin 51 is journaled to the arm 27 allowing pivoting of the arm. The spring 48 may be secured to the lower ring 31 by a pin 53 extending through a hole 54 in one side of the lower ring 31. The tensioning means causes the arm to pivot if one of the rings rotates relative to the other ring, irrespective of the position of the base 55.

Figure 8:
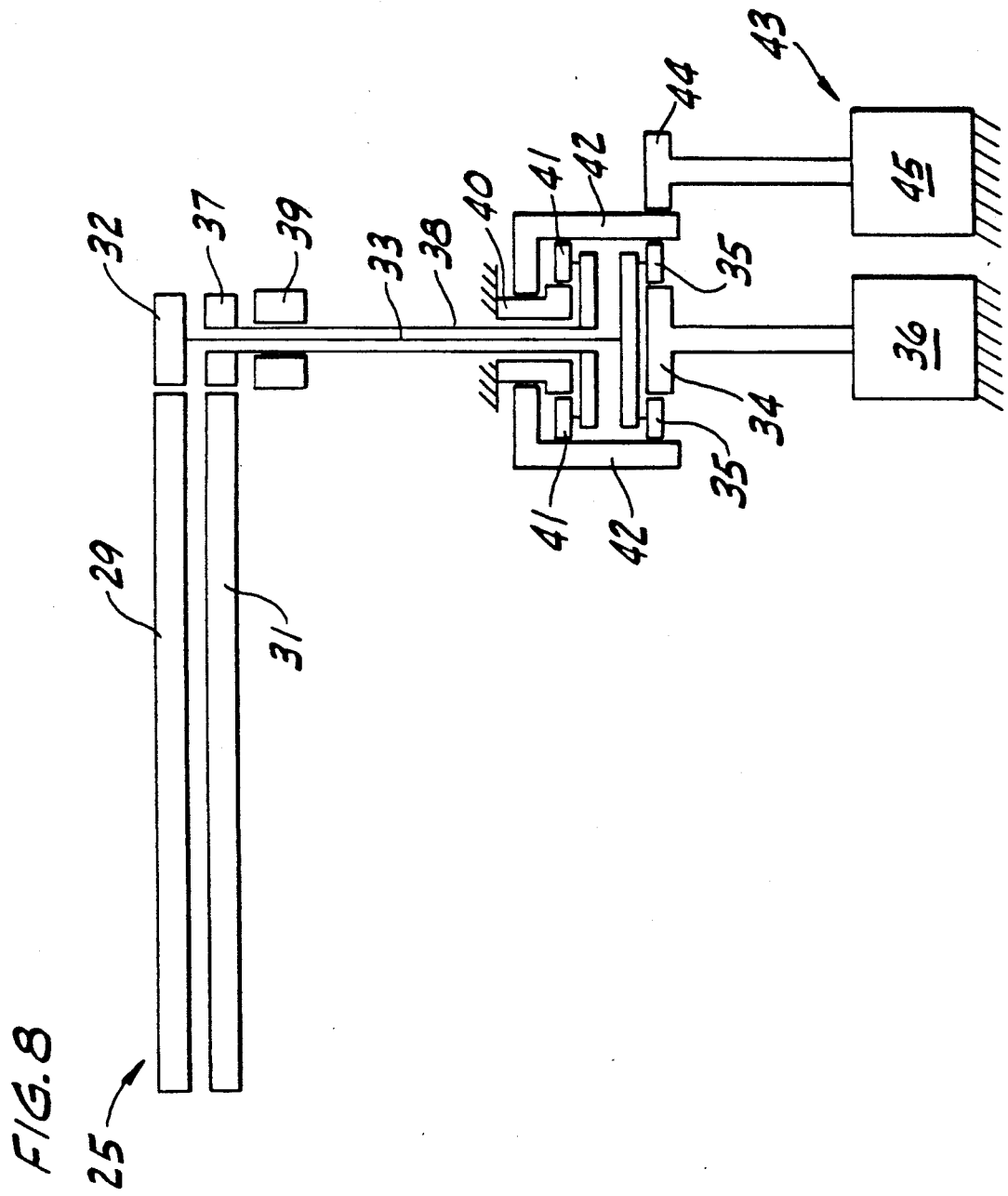
FIG. 8 is an exploded, side elevation view of the elements of one preferred embodiment of a single channel ring and arm assembly of the invention.

A typical mechanical arrangement to cause ring movement is shown in FIG. 8. An upper large drive ring 29 is driven by an upper pinion drive gear 32 supported by an inner coaxial shaft 33. The other end of the coaxial shaft 33 is driven by a sun gear 34 in combination with two lower planetary gears 35. An arm gear motor 36 turns the sun gear 34 causing the lower planetary gears 35 to rotate, thereby turning the upper pinion 32 and large drive gear 28. The lower large drive ring 31 is similarly driven by a lower pinion 37, an outer tubular coaxial shaft 38 supported by a bearing 39, a fixed sun gear 40, and upper planetary gears 41. Additionally, a ring gear 42 driven by an azimuth gear motor 45 turns to simultaneously rotate planetary gears 35, 41 of both upper and lower pinion drive gears 32, 37, thereby moving both large gears 28, 30 together. As a result, the azimuth drive pinion 44 driven by the azimuth gear motor 45 rotates the ring assembly 25 whereas the sun gear 34 driven by arm gear motor 36 pivots the arm. Therefore, rotating the base 55 moves both rings without changing the position of the arm relative to the rings.

There are several other approaches to this movable image pickup concept that can be utilized. One includes a vertical stacked ring approach where each ring has a radial arm that is pulled across the opening. The ring also can rotate and the radius can be varied to enable the pickup mirror to be positioned anywhere in the field. Another approach involves articulated arms with pickup mirrors, where a number of arms are mounted outside the optical field, and each arm can cover the field.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A communication system comprising:
   a ground station located on the Earth's surface;
   a plurality of low earth orbit (LEO) satellites;
   a geosynchronous (GEO) satellite including means for separately tracking each LEO satellite as it orbits about the Earth, means for communicating with the ground station, and means for optically communicating simultaneously and synchronously with the LEO satellites, said optically communicating means having means for optically monitoring a field of view encompassing the LEO satellites including a telescope and wherein the tracking means comprises a plurality of tracking devices, one for each visible LEO satellite needing to communicate, associated with the telescope for tracking the image of the LEO satellites viewed through the telescope and wherein each of the separate tracking devices comprises:
   a ring assembly supported by the GEO satellite;
   means for rotating the ring assembly about an axis coaxial with a central axis of the field of view;
   a rotatable arm having a mounted end pivotally positioned on the ring assembly and having a free end, said arm having a length approximately equal to the ring inner (open) radius and supporting a fiber optic cable path to detection means;
   means for pivoting the arm about its mounted end in a plane defined by the ring;
   an optical pickup means attached to the free end of the arm; and
   means for positioning the optical pickup means to be in optical communication with one of the LEO satellites including means for rotating the ring assembly and means for pivoting the arm whereby the free end of the arm tracks the movement of its LEO satellite.

2. A communications system according to claim 1 wherein each of the tracking devices is coaxial with the central axis of the field of view of the telescope.

3. A communications system according to claim 1 wherein the pivoting means comprises a second ring assembly and second means for rotating the second ring assembly about an axis coaxial with a central axis of the field of view, wherein the rotatable arm pivotally engages the second ring assembly and wherein the positioning means causes the rotating means and the second rotating means to selectively rotate the first and second ring assemblies, respectively, so that the free end of the arm tracks the movement of its LEO satellite.

4. A communications system according to claim 1 wherein the arm has a length approximately equal to half of the inner (open) diameter of the ring assembly.

5. A terminal according to claim 6 wherein each of the tracking devices is coaxial with the central axis of the field of view of the telescope.

6. A terminal for a geosynchronous (GEO) satellite of a communications system having a ground station located on the Earth's surface, and a plurality of low earth orbit (LEO) satellites, said terminal comprising:
   means for separately tracking a plurality of LEO satellites as it orbits about the Earth;
   means for communicating in duplex with the ground station; and
   means for optically communicating simultaneously and synchronously with the LEO satellites, said optically communicating means having means for optically monitoring a field of view encompassing the LEO satellites including a telescope and wherein the tracking means comprises a plurality of tracking devices, one for each LEO satellite, associated with the telescope for tracking the image of the LEO satellites viewed through the telescope and wherein each of the separate tracking devices comprises:
   a ring assembly;
   means for supporting the ring assembly within the field of view of the telescope;
   means for rotating the ring assembly about an axis coaxial with a central axis of the field of view;
   a rotatable arm having a mounted end pivotally positioned on the ring assembly and having a free end, said arm having a length approximately equal to the inner open ring radius;
   means for pivoting the arm about its mounted end in a plane defined by the ring;
   an optical pickup means attached to the free end of the arm to deliver the light to the transceiver; and
   means for positioning the optical pickup means to be in optical communication with one of the LEO satellites including means for rotating the ring assembly and means for pivoting the arm whereby the free end of the arm tracks the movement of its LEO satellite.

7. A terminal according to claim 6 wherein each of the tracking devices is coaxial with the central axis of the field of view of the telescope.

8. A terminal according to claim 6 wherein the pivoting means comprises a second ring assembly and second means for rotating the second ring assembly about an axis coaxial with a central axis of the field of view, wherein the rotatable arm pivotally engages the second ring assembly and wherein the positioning means causes the rotating means and the second rotating means to selectively rotate the first and second ring assemblies, respectively, so that the free end of the arm tracks the movement of its LEO satellite and delivers the optical signal to the transceiver assembly.

9. A terminal according to claim 6 wherein the arm has a length approximately equal to half of the inner open diameter of the ring assembly.

* * * * *